United States Patent
Kienzler et al.

(10) Patent No.: US 11,764,695 B2
(45) Date of Patent: Sep. 19, 2023

(54) DC-DC CONVERTER AND METHOD FOR OPERATING A DC-DC CONVERTER

(71) Applicant: Robert Bosch GmbH, Stuttgart (DE)

(72) Inventors: Christoph Kienzler, Gerlingen (DE); Emiliano Gudino Carrizales, Ludwigsburg (DE); Jan Riedel, Esslingen Am Neckar (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 17/632,269

(22) PCT Filed: Jul. 8, 2020

(86) PCT No.: PCT/EP2020/069198
§ 371 (c)(1),
(2) Date: Feb. 2, 2022

(87) PCT Pub. No.: WO2021/023460
PCT Pub. Date: Feb. 11, 2021

(65) Prior Publication Data
US 2022/0286058 A1 Sep. 8, 2022

(30) Foreign Application Priority Data
Aug. 5, 2019 (DE) ............ 10 2019 211 692.2

(51) Int. Cl.
*H02M 3/335* (2006.01)
*H02M 1/32* (2007.01)
*H02M 1/00* (2006.01)

(52) U.S. Cl.
CPC ..... *H02M 3/33576* (2013.01); *H02M 1/0064* (2021.05); *H02M 1/322* (2021.05);
(Continued)

(58) Field of Classification Search
CPC ........ H02M 3/01; H02M 3/015; H02M 3/325; H02M 3/335; H02M 3/33569; H02M 3/33571; H02M 3/33573; H02M 3/33592
See application file for complete search history.

(56) References Cited

U.S. PATENT DOCUMENTS

| | | | | |
|---|---|---|---|---|
| 5,432,431 A | * | 7/1995 | Vinciarelli | ............ H02M 3/155 323/222 |
| 2012/0126618 A1 | * | 5/2012 | Motegi | ............... H02M 3/1582 307/43 |

(Continued)

FOREIGN PATENT DOCUMENTS

| | | |
|---|---|---|
| DE | 102016200662 A1 | 7/2017 |
| EP | 0571232 A2 | 11/1993 |

(Continued)

OTHER PUBLICATIONS

Translation of International Search Report for Application No. PCT/EP2020/069198 dated Sep. 24, 2020 (2 pages).

(Continued)

*Primary Examiner* — Gary A Nash
(74) *Attorney, Agent, or Firm* — Michael Best & Friedrich LLP

(57) ABSTRACT

The present invention relates to a circuit arrangement and to an actuating method for a DC voltage converter, in particular a DC voltage converter with phase-shifted full-bridge topology, wherein power can also be transmitted from the primary side to the secondary side when the electrical voltage on the primary side undershoots the product of the electrical voltage on the secondary side and the transmission ratio of a transformer in the DC voltage converter. In this way, for example, a capacitor on the primary side of the DC voltage converter can be discharged to a safe, low voltage level.

10 Claims, 3 Drawing Sheets

(52) U.S. Cl.
CPC ........ *H02M 3/335* (2013.01); *H02M 3/33569* (2013.01); *H02M 3/33573* (2021.05)

(56) References Cited

U.S. PATENT DOCUMENTS

2012/0275203 A1* 11/2012 Shimada ............ H02M 1/4225
363/84
2019/0245455 A1* 8/2019 Gudino Carrizales ......................
H02M 3/33507

FOREIGN PATENT DOCUMENTS

| JP | 2000224855 A | | 8/2000 | |
|---|---|---|---|---|
| JP | 2018170930 A | * | 11/2018 | |
| JP | 2018170930 A | | 11/2018 | |
| WO | WO-2017125204 A1 | * | 7/2017 | ............ B60L 3/0046 |
| WO | WO-2018072987 A1 | * | 4/2018 | .............. B60L 53/22 |

OTHER PUBLICATIONS

Sebastian et al., "A very simple method to obtain one additional fully regulated output in zero-current-switched quasiresonant converters", IEEE Proceedings of the Annual Power Electronics Specialists Conference, vol. 2, 1990, pp. 536-542.

* cited by examiner

DC-DC CONVERTER AND METHOD FOR OPERATING A DC-DC CONVERTER

BACKGROUND OF THE INVENTION

The present invention relates to a DC-DC converter. The present invention furthermore relates to a method for driving a DC-DC converter.

DC-DC converters are used in numerous fields. For example, electrical energy can be transmitted between a high-voltage power supply system and a low-voltage power supply system of an electric vehicle by means of a DC-DC converter. For this purpose, a DC voltage present at an input terminal of a DC-DC converter can be converted by means of the DC-DC converter into a further DC voltage, wherein the level of the electrical voltage at the input can be different than the level of the electrical voltage at the output of the DC-DC converter. In particular, for example, so-called phase-shifted full-bridge topologies are known. Such DC-DC converters comprise a transformer having a fixed transformation ratio. In this case, variable setting of the output voltage is possible by means of a settable phase shift. The limits of the voltage ratio between input voltage and output voltage are in this case limited inter alia by the transformation ratio of a transformer in the DC-DC converter.

Document DE 10 2016 200 662 A1 describes a bidirectional DC-DC converter for transmitting electrical energy between a high-voltage power supply system and a low-voltage power supply system of an electric vehicle. By virtue of operation of the DC-DC converter in the reverse direction, in this case a DC-link capacitor on the primary side of the DC-DC converter can be charged by the energy on the secondary side of the DC-DC converter.

SUMMARY OF THE INVENTION

The present invention discloses a DC-DC converter and a method for operating a DC-DC converter having the features of the independent patent claims. Further embodiments are the subject matter of the dependent patent claims.

Accordingly, the following is provided:

A DC-DC converter comprising a first transformer, a first full-bridge circuit, a second full-bridge circuit, and a second transformer. The first full-bridge circuit is arranged electrically between a first terminal of the DC-DC converter and a primary side of the first transformer. The second full-bridge circuit is arranged electrically between a second terminal of the DC-DC converter and a secondary side of the first transformer. A primary side of the second transformer is arranged electrically between the second full-bridge circuit and a first terminal element of the second terminal of the DC-DC converter. Furthermore, a series circuit comprising the secondary side of the transformer, a first switching element and a first diode is provided. This series circuit is arranged electrically between the first terminal element of the second terminal of the DC-DC converter and a second terminal element of the second terminal of the DC-DC converter. In particular, in this case the first diode is arranged between the first terminal element and the second terminal element of the second terminal of the DC-DC converter in the forward direction. In other words, an anode of the first diode points in the direction of the terminal element with the positive polarity, and a cathode of the diode points in the direction of the terminal element of the second terminal with the negative polarity.

Furthermore, the following is provided:

A method for driving a phase-shifted full-bridge DC-DC converter having a step for charging a secondary side of a transformer, wherein the transformer is arranged as series inductance on the output side at the DC-DC converter. In addition, the method comprises a step for discharging the electrical energy stored in the secondary side of the transformer via the primary side of the transformer.

The present invention is based on the knowledge that the voltage range in which DC-DC converters, in particular DC-DC converters with a phase-shifted full-bridge topology, generally only enable energy transmission within a restricted voltage range. This voltage range is limited in particular in the case of phase-shifted full-bridge DC-DC converters by the transformation ratio of the transformer between the primary side and the secondary side. In the case of a transformation ratio between the primary side and the secondary side of N, in this case the voltage on the primary side needs to be greater than the product of the transformation ratio N and the voltage on the secondary side.

Therefore, one concept of the present invention consists in taking account of this knowledge and providing an extended topology for a phase-shifted full-bridge DC-DC converter which also enables energy transmission from the primary side to the secondary side beyond the abovementioned limitation. In particular, the topology according to the invention enables energy transmission from the primary side to the secondary side even when the input voltage on the primary side is less than the abovementioned limit comprising the product of the transformation ratio and the secondary voltage.

For this purpose, a transformer is provided in place of a simple series inductance on the secondary side. In this case, similarly to a conventional series inductance, the primary side of the additional transformer can be connected between the secondary-side full-bridge and an output terminal of the DC-DC converter. In addition, the secondary side of the additional transformer, together with a switching element and a diode arranged in the forward direction, forms a series circuit between the positive and negative terminals of the secondary side of the DC-DC converter. By closing of the switching element, the secondary side of the additional transformer can be charged. By opening of the switching element, the energy is transmitted from the secondary side of the additional transformer to the primary side and in this case enables an energy transmission through the DC-DC converter from the primary side to the secondary side even when the electrical voltage on the primary side falls below the abovementioned limitation.

In this way, for example, it is possible to discharge a primary-site capacitor, such as, for example, a DC-link capacitor, to a safe voltage level. Therefore, an additional discharge circuit for such a DC-link capacitor can be dispensed with.

Owing to the discharge of a DC-link capacitor corresponding to the topology according to the invention, therefore, the complexity involved and therefore also the costs incurred for an additional charge voltage can be saved. Furthermore, it is also possible to transmit the electrical energy stored in the DC-link capacitor at least partially to the secondary side of the DC-DC converter. The energy from the DC-link capacitor is therefore not completely lost, but can be used at least partially on the secondary side of the DC-DC converter. Therefore, the efficiency of the overall system is also increased.

In accordance with one embodiment, a second diode is arranged in parallel with the first switching element. The second diode is in particular arranged back-to-back in parallel with the first diode. In other words, the cathode of the second diode points in the direction of the positive terminal element of the second terminal of the DC-DC converter. For example, the second diode may be a so-called body diode of the first switching element.

In accordance with a further embodiment, a second switching element is arranged in parallel with the second diode. In this way, the functionality of the DC-DC converter can be increased further still. For example, by virtue of suitable driving of the second switching element, an energy flow can also be realized in the reverse direction, i.e. from the secondary side to the primary side of the DC-DC converter.

In accordance with one embodiment, the first terminal of the DC-DC converter is designed to be electrically coupled to a first voltage source, and the second terminal of the DC-DC converter is designed to be electrically coupled to a second voltage source. In particular, the electrical voltage of the first voltage source, i.e. at the first input terminal, can be greater than the electrical voltage of the second voltage source at the second terminal of the DC-DC converter. For example, the first terminal of the DC-DC converter can be coupled to a high-voltage power supply system, such as, for example, the high-voltage power supply system of an electric vehicle. In this case, the second terminal of the DC-DC converter can be coupled, for example, to a low-voltage power supply system, in particular a low-voltage power supply system of an electric vehicle.

In accordance with one embodiment, the DC-DC converter is designed to transmit electrical energy from the first terminal of the DC-DC converter in the direction of the second terminal of the DC-DC converter. In particular, the DC-DC converter can be designed to transmit electrical energy from the first terminal to the second terminal even when an electrical voltage at the first terminal of the DC-DC converter is lower than the product of a transformation ratio of the first transformer and the electrical voltage at the second terminal of the DC-DC converter.

In accordance with one embodiment, the first terminal of the DC-DC converter is designed to be coupled to a DC-link capacitor. In this case, the DC-DC converter can be designed to discharge the DC-link capacitor. In particular, the DC-DC converter can be designed to discharge the DC-link capacitor below a predetermined electrical voltage threshold. In this way, the DC-link capacitor can be discharged to a safe and non-hazardous voltage level. In this case, additional discharge circuits can be dispensed with. The DC-link capacitor can be in this case in particular discharged to an electrical voltage which is lower than the product of the transformation ratio of the first transformer and the voltage at the second terminal of the DC-DC converter.

In addition or as an alternative, the DC-DC converter can be designed to supply power to a load on the secondary side of the DC-DC converter via the energy on the primary side even when the voltage on the primary side is lower than a predetermined minimum voltage. The predetermined minimum voltage is in this case preset by a transformation ratio of the transformer. In particular, the minimum voltage can result from the product of the electrical voltage on the secondary side and the transformation ratio of the transformer.

In accordance with one embodiment, the second full-bridge circuit comprises two half-bridges each having two switching elements. Furthermore, the first full-bridge circuit can also comprise two half-bridges each having two switching elements. The DC-DC converter can in this case be designed to drive the switching elements of the first full-bridge circuit, of the second full-bridge circuit and the first and possibly also the second switching element. In particular, the driving of the switching elements can take place, for example, by means of a suitable control device.

In accordance with one embodiment, the DC-DC converter, in particular the control device of the DC-DC converter, can be designed to close the first switching element and to open the switching elements of the first full-bridge circuit in a first switching interval. Furthermore, the first switching element can be opened and in each case two switching elements in a diagonal path of the first full-bridge circuit can be closed in a second switching interval. In this way, during the first switching interval, the secondary side of the second transformer can be charged. In the second switching interval, thereupon the electrical energy can be transmitted from the secondary side to the primary side of the second transformer. In this way, energy can be transmitted from the primary side of the DC-DC converter to the secondary side of the DC-DC converter even when the electrical voltage on the primary side of the DC-DC converter falls below the product of the transformation ratio and the voltage on the secondary side.

In accordance with one embodiment, the DC-DC converter, in particular the control device of the DC-DC converter, can be designed to open and close, in each case alternately, the switching elements of different diagonal paths in the first full-bridge circuit in two successive second switching intervals. In this way, symmetrical driving of the DC-DC converter and the switching elements in the DC-DC converter can take place.

The above configurations and developments can be combined with one another as desired, insofar as this is sensible. Further configurations, developments and implementations of the invention also include combinations, which have not been explicitly mentioned, of features of the invention which have been described above or below with respect to the exemplary embodiments. In particular, a person skilled in the art will also add individual aspects as improvements or additions to the respective basic forms of the invention.

BRIEF DESCRIPTION OF THE DRAWINGS

Further features and advantages of the present invention will be explained below with reference to the figures, in which.

DETAILED DESCRIPTION

Figure 1:
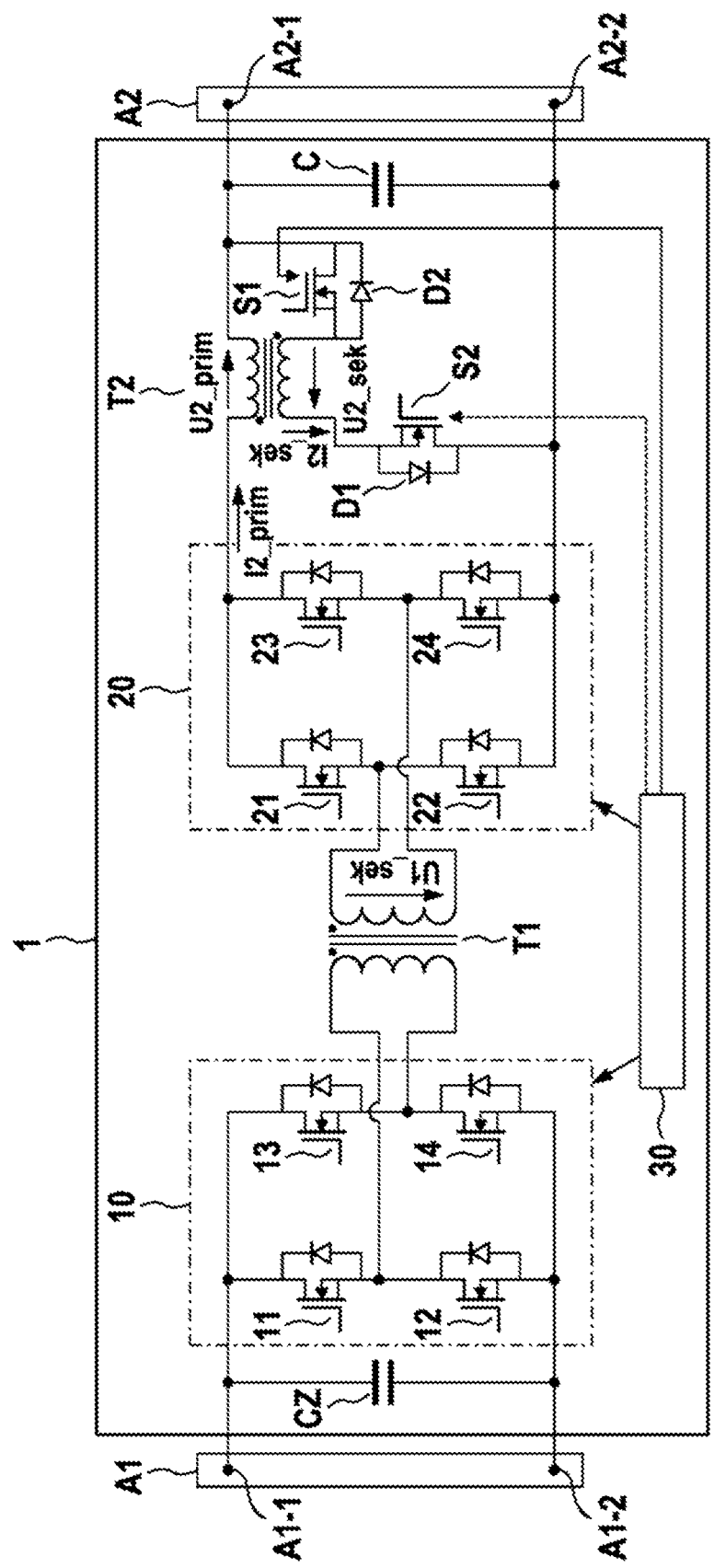
FIG. 1 shows a schematic illustration of a basic circuit diagram of a DC-DC converter in accordance with one embodiment.

FIG. 1 shows a schematic illustration of a basic circuit diagram which forms the basis of a DC-DC converter 1 in accordance with one embodiment. The DC-DC converter 1 comprises, for example, a first terminal A1 having a first terminal element A1-1 and a second terminal element A1-2. At this first terminal A1, the DC-DC converter 1 can be electrically coupled, for example, to a voltage source, such as, for example, a high-voltage power supply system of an electric vehicle. The first terminal A1 can be connected to or disconnected from the voltage source, for example, by means of a suitable switch disconnector. Furthermore, a capacitor, such as, for example, a DC-link capacitor CZ, can be arranged, for example, between the two terminal elements A1-1 and A1-2.

Furthermore, the DC-DC converter 1 comprises a second terminal A2, which likewise has a first terminal element A2-1 and a second terminal element A2-2. At this second terminal A2, the DC-DC converter 1 can be electrically coupled to a further voltage source, for example a low-voltage power supply system of an electric vehicle or the like. Likewise, a capacitor C can be provided between the first terminal element A2-1 and the second terminal element A2-2.

Furthermore, the DC-DC converter 1 comprises a first full-bridge circuit 10. The first full-bridge circuit 10 comprises two half-bridges. The first half-bridge in this case comprises a series circuit comprising two switching elements 11 and 12, and the second half-bridge comprises a series circuit comprising the two switching elements 13 and 14. In addition, the DC-DC converter 1 comprises a second full-bridge circuit 20. The second full-bridge circuit 20 can likewise comprise two half-bridges each having two switching elements 21-24. A first transformer T1 is provided between the first full-bridge circuit 10 and the second full-bridge circuit 20. The primary side of the first transformer T1 is connected at a terminal to a first node of the first half-bridge of the first full-bridge circuit 10. A second terminal of the primary side of the first transformer T1 is connected to a further node of the second half-bridge of the first full-bridge circuit 10. Similarly, a first terminal of the secondary side of the first transformer T1 is connected to a node of the first half-bridge of the second full-bridge circuit 20, and a second terminal of the secondary side of the first transformer T1 is connected to a further node of the second half-bridge of the second full-bridge circuit 20.

The turns ratio between the primary side and the secondary side of the first transformer T1 is in this case, for example, N. Correspondingly, electrical energy can be transmitted from the first terminal A1 to the second terminal A2 without additional complexity by means of a previously described circuit arrangement as long as the electrical voltage $U\_prim$ at the first terminal A1 at least corresponds to the product of the transformation ratio N and the electrical voltage $U1\_sek$ at the second output terminal A2.

The second full-bridge circuit 20 is furthermore coupled to the second terminal A2 of the DC-DC converter 1. In this case, a terminal element, for example the second terminal element A2-2, is connected directly to the second full-bridge circuit 20. A series inductance is provided between the other terminal element, for example the first terminal element A2-1 of the second terminal A2, and the second full-bridge circuit 20. This series inductance can be realized, for example, by means of a second transformer T2. In this case, a primary side of the second transformer T2 is arranged between the second full-bridge circuit 20 and the first terminal element A2-1 of the second terminal A2. Furthermore, the secondary side of the second transformer T2, together with a first switching element S1 and a first diode D1, forms a series circuit, which is arranged between the first terminal element A2-1 and the second terminal element A2-2 of the second terminal A2. In this case, the first diode D1 is arranged in the forward direction, i.e. the cathode of the first diode D1 points in the direction of the negative polarity, and the anode of the first diode D1 points in the direction of the positive polarity. In particular, the first switching element S1 is arranged between the first terminal element A2-1 of the second terminal and a first terminal of the secondary side of the second transformer T2, and the first diode D1 is arranged between the second terminal element A2-2 of the second terminal A2 and a second terminal of the secondary side of the second transformer T2.

In addition, a second diode D2 can be provided in parallel with the first switching element S1. This second diode D2 can be arranged back-to-back in parallel with the first diode D1, i.e. the second diode D2 is arranged in the reverse direction so that the cathode of the second diode D2 points in the direction of the positive polarity at the second terminal A2. In addition, a second switching element S2 can be provided in parallel with the first diode D1.

The switching elements 21-24 of the second full-bridge 20 and the first switching element S1 and possibly also the switching elements 11-14 of the first full-bridge 10 and/or the second switching element S2 can be controlled, for example, by means of a suitable control device 30. The principle and the switching sequence in which the individual switching elements are driven in this case will be explained in more detail below. In particular, by virtue of targeted driving of the first switching element S1 by the previously described circuit arrangement, energy transmission can take place even when an electrical voltage $U\_prim$ which is lower than the product of the transformation ratio N of the transformer and the voltage $U1\_sek$ at the second terminal A2 of the DC-DC converter 1 is present at the first terminal A1 on the primary side.

Figure 2:
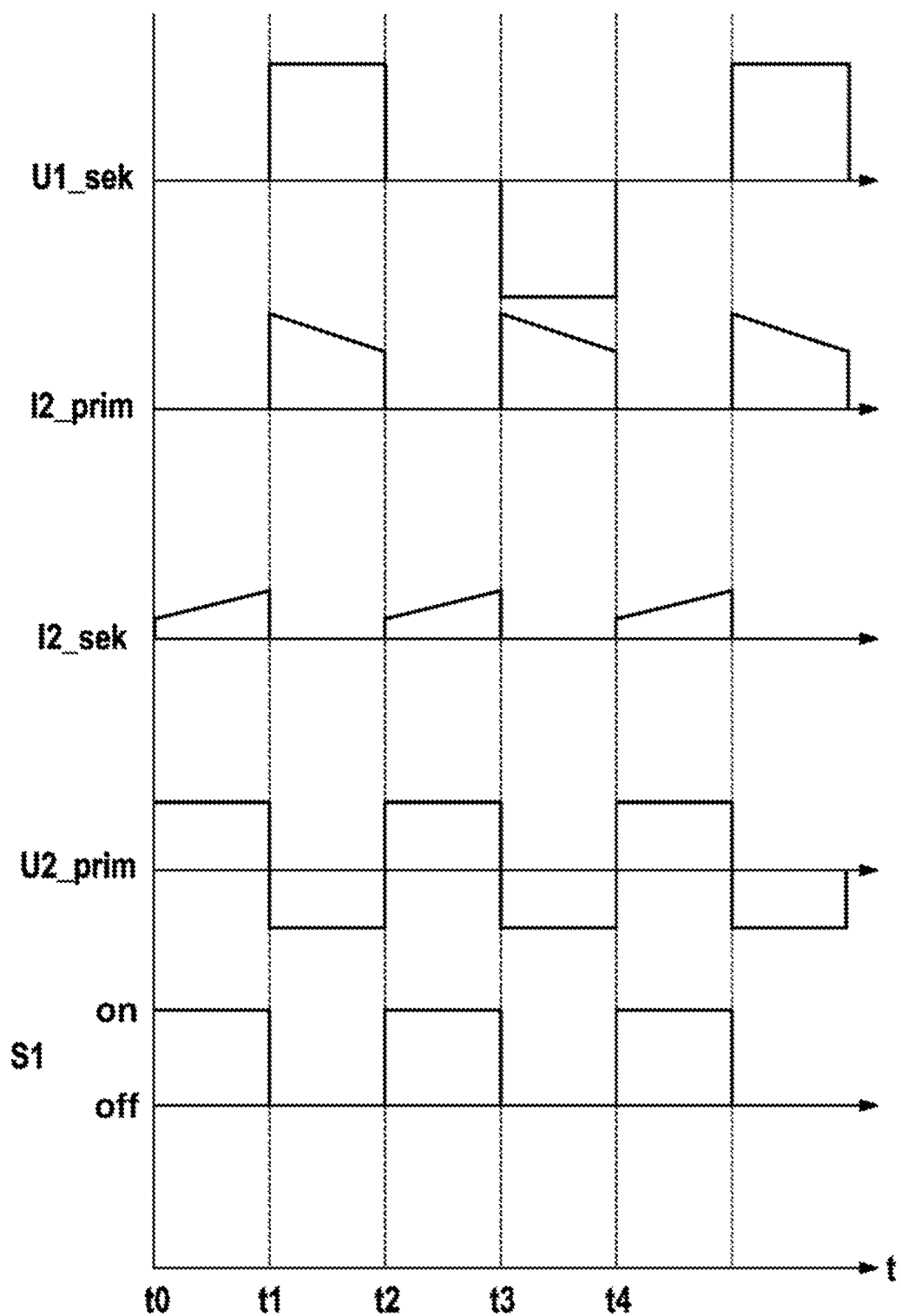
FIG. 2 shows a schematic illustration of a timing diagram for the switching states and the voltage and current characteristics in a DC-DC converter in accordance with one embodiment.

FIG. 2 shows a schematic illustration of the switching patterns and voltage/current characteristics of a drive method of the DC-DC converter 1 in accordance with one embodiment. With the drive method described below, it is in particular possible to transmit electrical energy from the primary side of the DC-DC converter 1 to the secondary side of the DC-DC converter 1 even when the electrical voltage on the primary side is lower than the product of the transformation ratio N of the transformer and the electrical voltage on the secondary side of the DC-DC converter 1.

In a first time interval between time t0 and t1, the switching elements 21-24 of the second full-bridge 20 and possibly also the switching elements 11-14 of the first full-bridge 10 are open. Furthermore, the first switching element S1 is in the closed state. Thus, an electrical current $I2\text{-}sek$ with an initially increasing current intensity flows through the first switching element S1, the secondary side of the second transformer T2 and the first diode D1.

At time t1, the first switching element S1 is opened. Furthermore, in the first full-bridge circuit 10, the switching elements 11 and 14 of a diagonal branch are closed. In this case, the energy is transmitted from the secondary side of the second transformer T2 to the primary side of the second transformer T2, and an electrical current flows through the secondary side of the first transformer T1. The electrical voltage $U1\_sek$ present across the secondary side of the first transformer in this case results in an energy transmission from the primary side of the DC-DC converter 1 to the secondary side. If appropriate, the corresponding switching elements 21 and 24 of the second full-bridge circuit 20 can be actively driven for this purpose. Alternatively, the electrical current can also flow through the parallel body diodes.

At time t2, the switching elements 11-14 of the first full-bridge circuit 10 and if appropriate the switching elements 21-24 of the second full-bridge circuit 20 are opened. Furthermore, the first switching element S1 is closed and a renewed current flow through the secondary side of the second transformer T2 takes place. At time t3, the first switching element S1 is opened again. In addition, at time t3, the closing of the switching elements 12 and 13 in the second diagonal branch of the first full-bridge circuit 10 takes place. Therefore, the secondary side of the second transformer T2 is again discharged via the primary side of the second transformer T2, and there is now an electrical voltage U1_sek with a reverse polarity present across the secondary side of the first transformer T1. In this case, in this time interval, an energy transmission from the primary side to the secondary side likewise takes place.

Figure 3:
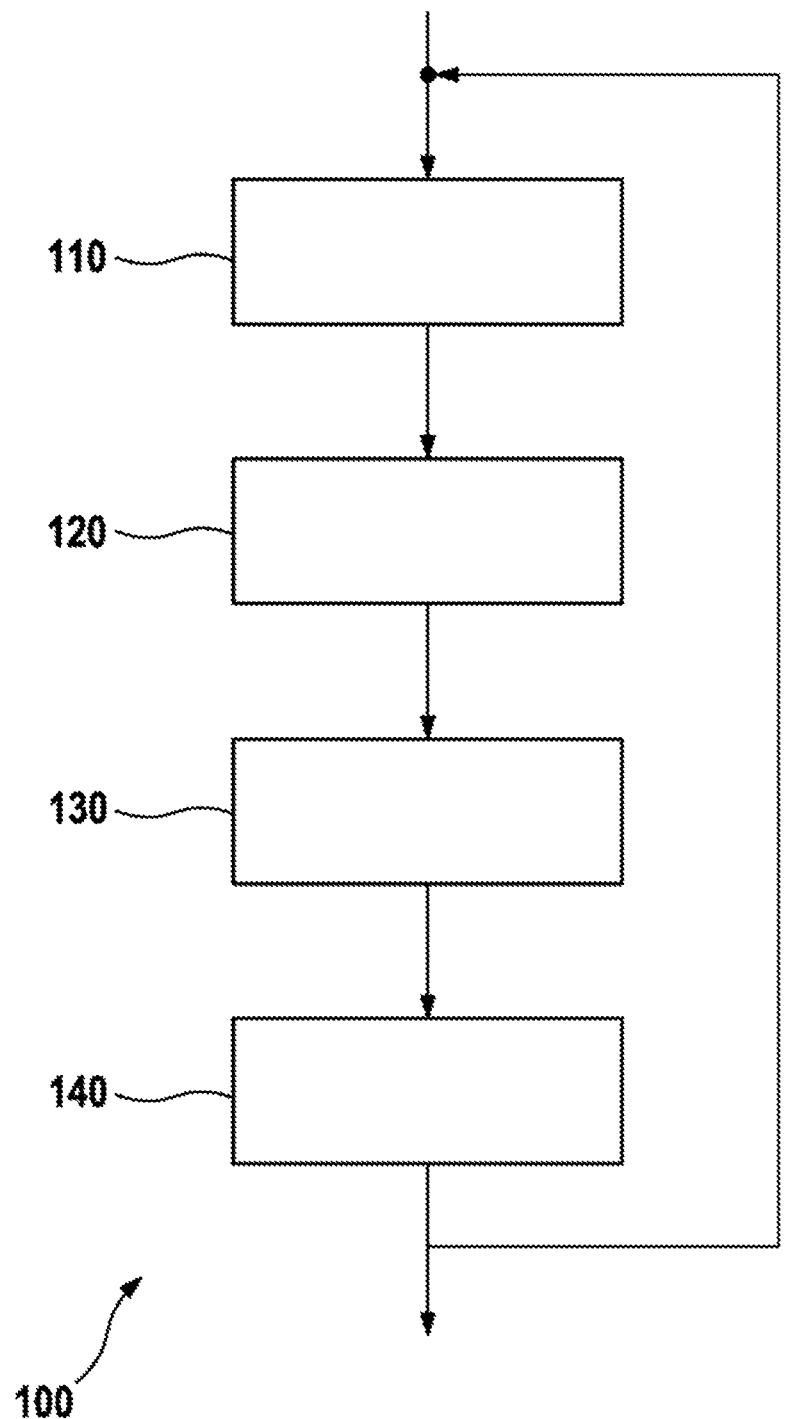
FIG. 3 shows a schematic illustration of a flowchart, which forms the basis of a method for operating a DC-DC converter in accordance with one embodiment.

FIG. 3 shows a schematic illustration of a flowchart which forms the basis of a method 100 for energy transmission from the primary side to the secondary side of a DC-DC converter in accordance with one embodiment. In a first step 110, the charging of the secondary side of the second transformer T2 takes place by closing of the first switching element S1. Then, in a step 120, the discharge of the secondary side of the second transformer takes place by opening of the first switching element and closing of the switching elements in a diagonal branch of the first full-bridge circuit 10. In step 130, renewed charging of the secondary side of the second transformer T2 takes place by closing of the first switching element S1. Finally, in step 140, in turn discharge of the secondary side of the second transformer T2 takes place, wherein the first switching element S1 is open again. In this case, the switching elements in the second diagonal branch of the first full-bridge circuit 10 are in the closed state. In this case, during steps 120 and 140, an energy transmission can take place from the primary side to the secondary side of the DC-DC converter 1. The energy transmission can take place in particular even when the electrical voltage at the first terminal A1 on the primary side is lower than the product of the transformation ratio and the electrical voltage at the second terminal on the secondary side of the DC-DC converter 1.

By way of summary, the present invention relates to a circuit arrangement and a drive method for a DC-DC converter, in particular a DC-DC converter having a phase-shifted full-bridge topology, wherein energy transmission from the primary side to the secondary side can take place even when the electrical voltage on the primary side falls below the product of the electrical voltage on the secondary side and the transformation ratio of a transformer in the DC-DC converter. In this way, for example, a capacitor on the primary side of the DC-DC converter can be discharged to a safe, low voltage level.

The invention claimed is:

1. A DC-DC converter (1), comprising:
a first transformer (T1),
a first full-bridge circuit (10), which is arranged electrically between a first terminal (A1) of the DC-DC converter (1) and a primary side of the first transformer (T1);
a second full-bridge circuit (20), which is arranged electrically between a second terminal (A2) of the DC-DC converter (1) and a secondary side of the first transformer (T1);
a second transformer (T2), wherein a primary side of the second transformer (T2) is arranged electrically between the second full-bridge circuit (20) and a first terminal element (A2-1) of the second terminal (A2) of the DC-DC converter (1), and wherein a series circuit comprising the secondary side of the second transformer (T2), a first switching element (S1) and a first diode (D1) is arranged between the first terminal element (A2-1) and a second terminal element (A2-2) of the second terminal (A2) of the DC-DC converter (1),
and wherein the first diode (D1) is arranged between the first terminal element (A2-1) and the second terminal element (A2-2) of the second terminal (A2) of the DC-DC converter (1) in the forward direction;
wherein the first switching element (S1) is arranged between the first terminal element (A2-1) of the second terminal (A2) and the secondary side of the second transformer (T2) and wherein the first diode (D1) is arranged between the second terminal element (A2-2) of the second terminal (A2) and the secondary side of the second transformer (T2).

2. The DC-DC converter (1) as claimed in claim 1, wherein a second diode (D2) is arranged in parallel with the first switching element (S1), and
wherein the second diode (D2) is arranged back-to-back in parallel with the first diode (D1).

3. The DC-DC converter (1) as claimed in claim 1, wherein a second switching element (S2) is arranged in parallel with the first diode (D1).

4. The DC-DC converter (1) as claimed in claim 1, wherein the first terminal (A1) of the DC-DC converter (1) is designed to be electrically coupled to a first voltage source,
the second terminal (A2) of the DC-DC converter (1) is designed to be electrically coupled to a second voltage source, and
wherein an electrical voltage of the first voltage source is greater than an electrical voltage of the second voltage source.

5. The DC-DC converter (1) as claimed in claim 1, wherein the DC-DC converter (1) is designed to transmit electrical energy from the first terminal (A1) of the DC-DC converter (1) in the direction of the second terminal (A2) of the DC-DC converter (1).

6. The DC-DC converter (1) as claimed in claim 1, wherein the first terminal (A1) of the DC-DC converter (1) is designed to be coupled to a DC-link capacitor (CZ), and
wherein the DC-DC converter (1) is designed to discharge the DC-link capacitor (CZ) below a predetermined electrical voltage and/or to supply power to a load on the secondary side of the DC-DC converter (1) via the energy on the primary side even when the voltage on the primary side is lower than a predetermined minimum voltage, wherein the predetermined minimum voltage has been preset by a transformation ratio of the transformer (T1).

7. The DC-DC converter (1) as claimed in claim 1, wherein the first full-bridge circuit (10) comprises two half-bridges each having two switching elements (11-14), and
wherein the second full-bridge circuit (20) comprises two half-bridges each having two switching elements (21-24); and
wherein the DC-DC converter (1) furthermore comprises a control device (30), which is designed to drive the switching elements (11-14) of the first full-bridge circuit (10), the switching elements (21-24) of the second full-bridge circuit (20) and the first switching element (S1).

8. The DC-DC converter (1) as claimed in claim 7, wherein the control device (30) is designed to close the first switching element (S1) and to open the switching elements (11-14) of the first full-bridge circuit in a first switching element interval, and to open the first switching element (S1) and to close in each case the first switching elements in a diagonal path of the first full-bridge circuit (10) in a second switching element interval.

9. The DC-DC converter (1) as claimed in claim 8, wherein the control device (30) is designed to alternately open and close, in each case alternately, the switching elements (11-14) of different diagonal paths in the first full-bridge circuit (10) in two successive second switch intervals.

10. A method (100) for driving the DC-DC converter of claim 1, the method comprising the following steps:
    charging (110) a secondary side of a transformer (T2), which is arranged as series inductance on the output side at the DC-DC converter; and
    discharging (120) the electrical energy stored in the secondary side of the transformer (T2) via the primary side of the transformer (T2).

\* \* \* \* \*